United States Patent
Scaramucci

[15] 3,675,677
[45] July 11, 1972

[54] DISC VALVE WITH MOLDED-IN-PLACE LINER AND REPLACEABLE SEAT

[72] Inventor: Domer Scaramucci, 3245 S. Hattie, Oklahoma City, Okla. 73129

[22] Filed: April 2, 1970

[21] Appl. No.: 25,040

[52] U.S. Cl. .................................. 137/375, 251/306
[51] Int. Cl. ............................................. F16k 1/22
[58] Field of Search ............. 137/315, 375, 454.2; 251/306

[56] References Cited

UNITED STATES PATENTS

| | | | |
|---|---|---|---|
| 3,124,334 | 3/1964 | Szohatzky | 251/315 X |
| 3,290,001 | 12/1966 | Taylor | 251/306 X |
| 3,334,650 | 8/1967 | Lowrey et al. | 137/375 |
| 3,450,151 | 6/1969 | Heutzenroeder | 137/375 |
| 3,473,784 | 10/1969 | Radford | 251/306 |
| 3,318,569 | 5/1967 | Manor | 251/315 |
| 3,370,825 | 2/1968 | Scaramucci | 251/148 |
| 3,528,448 | 9/1970 | Urban | 251/306 X |
| 3,534,939 | 10/1970 | Frazier et al. | 251/306 |
| 3,371,907 | 3/1968 | Scaramucci | 251/309 X |

Primary Examiner—Henry T. Klinksiek
Attorney—Dunlap, Laney, Hessin & Dougherty

[57] ABSTRACT

A disc valve having an elastomer lining molded-in-place therein shielding the valve body from the fluid being handled and forming seals around the valve stem. The disc of the valve is of the off-set type and engages a replaceable seat. Dual seats are also disclosed. The combination of the valve body in a surrounding operating housing supporting the valve operator is also disclosed.

9 Claims, 5 Drawing Figures

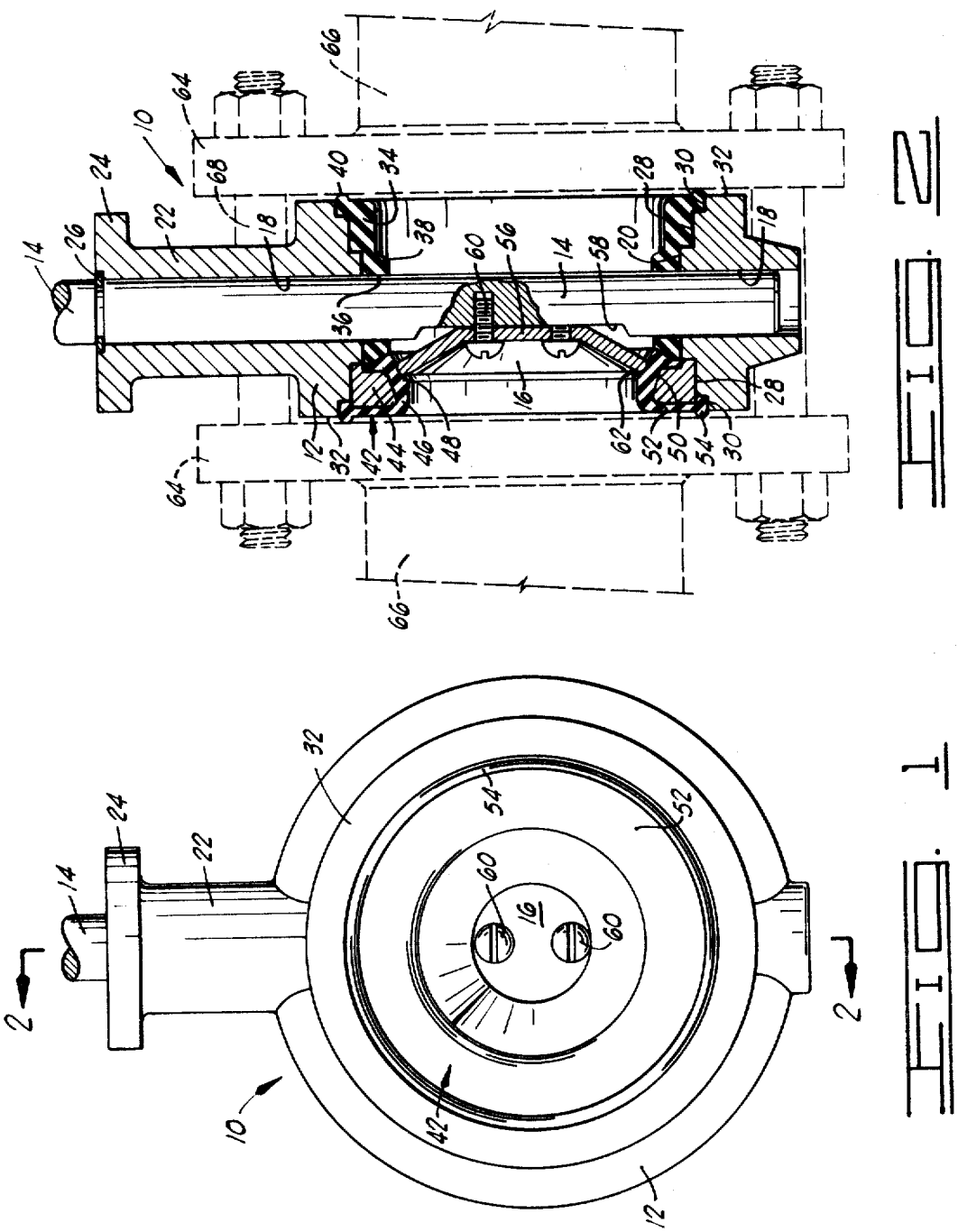

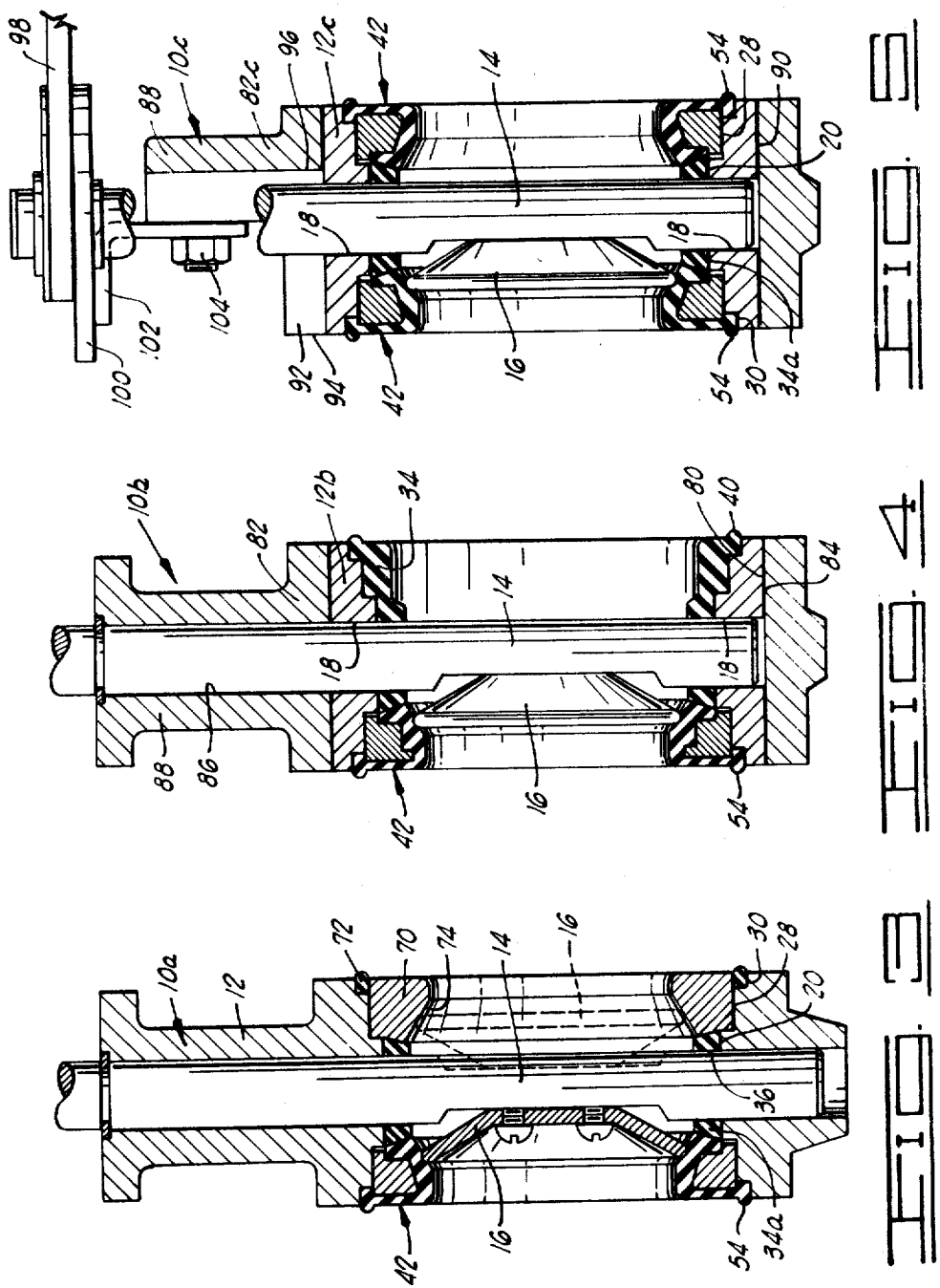

DISC VALVE WITH MOLDED-IN-PLACE LINER AND REPLACEABLE SEAT

BACKGROUND OF THE INVENTION

1. Field of the Invention

This invention relates generally to improvements in disc valves, and more particularly, to an improved lined disc valve.

2. Description of the Prior Art

The prior art contains many teachings of liners for disc type valves. Some such linings are molded-in-place, some are preformed and then bonded in place, and others are replaceable. In each instance, however, if the entire inner periphery of the valve body is shielded from the fluid being handled, the seat for the valve is a part of the lining, with the result that if the lining is bonded to the valve body, the entire valve body is effectively lost in the event of damage to the seat portion of the lining and, as is well known, the seat is normally the portion of the valve receiving the most wear.

SUMMARY OF THE INVENTION

An object of the invention is to provide a disc valve having a replaceable valve seat and yet and the body of the valve is effectively shielded from the fluid being controlled by the valve.

Another object of the invention is to provide a molded-in-place lining for a disc type valve which forms effective stem seals and cooperates with one or more replaceable seats to effectively shield the valve body from the fluid being controlled by the valve.

A further object of the invention is to provide a disc valve having a dual seating arrangement wherein the valve body is effectively shielded from the fluid being controlled by the valve.

A still further object of the invention is to provide a disc type valve which may be economically constructed, which will have a long service life, and which may be easily and economically repaired.

Other objects and advantages of the invention will be evident from the following detailed description when read in conjunction with the accompanying drawings.

BRIEF DESCRIPTION OF THE DRAWING

FIG. 1 is an end view of a valve constructed in accordance with this invention.

FIG. 2 is a vertical sectional view taken along lines 2—2 of FIG. 1, with the further illustration of pipe sections and pipe flanges at the opposite ends of the valve.

FIG. 3 is a view similar to FIG. 2 illustrating a modified construction.

FIG. 4 is another illustration similar to FIG. 2 showing another embodiment.

FIG. 5 is another illustration similar to FIG. 2 showing still another embodiment of the invention.

DESCRIPTION OF THE PREFERRED EMBODIMENTS

Referring to the drawings in detail, and particularly FIGS. 1 and 2, reference character 10 generally designates a valve constructed in accordance with this invention and basically comprising a tubular valve body 12, a valve stem 14 and a disc 16 carried by the stem 14 for controlling the flow of fluid through the valve. The valve body 12 has diametrically opposed apertures 18 formed on the opposite sides of the bore 20 through the body to journaly support the valve stem 14. The housing 12 also includes a neck 22 extending radially from the main body portion of the body, and the neck 22 has an annular flange 24 on the outer end thereof to support any desired type of valve operator and indexing mechanism (not shown) used to turn the valve stem 14 and open and close the valve. The valve stem 14 extends through the neck 22 and is prevented from moving lengthwise in one direction by a split locking ring 26 fitting in mating annular grooves in the outer periphery of the valve stem and the inner periphery of the neck 22 at the outer end of the neck.

A pair of concentric counterbores 28 and 30 are formed in the valve body 12 at each end of the bore 20, with the larger counterbore at each end of the body communicating with the respective end face 32 of the body. A lining 34 of elastomeric material, such as a rubber composition, is bonded to the inner periphery of the valve body 12 from the inner end of the counterbore 28 at one end of the body to the opposite end of the body. The lining 34 is preferably molded-in-place in the valve body 12 to inhance the adherence of the lining to the inner periphery of the body and minimize the possibility of the fluid being handled from gaining access between the lining and the inner periphery of the body. The lining 34 encompasses and sealingly engages the valve stem 14 at the opposite sides of the bore 20 to form seals and prevent the fluid being controlled from leaking out through the apertures 18. The diameter of each aperture 36 formed in the lining 34 receiving the stem 14 has a diameter less than the diameter of the stem to provide an interference fit between the lining and the stem. Also, an annular boss 38 is formed on the lining around each aperture 36 extending radially inwardly with respect to the bore 20, such that the pressure of fluid in the valve will urge the elastomeric material in each boss 38 tightly into engagement with the stem 14 to enhance the effectiveness of the stem seals. In other words, by forming the bosses 38, the stem seals are made pressure-responsive. It will also be observed in FIG. 2 that the lining 34 fits in the counterbores 28 and 30 at one end of the valve body and protrudes beyond the respective end face 32 of the body to form an annular sealing bead 40 directly opposed to the bottom of the respective counterbore 30.

A replaceable seat 42 is positioned in the opposite end 32 of the valve body. The seat 42 comprises a ring 44 of relatively rigid material, such as metal, having an outer diameter of a size to provide a sliding fit of the ring in the counterbore 28 at the respective end of the body. An elastomeric material 46 is bonded around the inner periphery of the ring 44 to form a seating surface 48 shaped and positioned to engage the entire outer periphery of the disc 16 when the disc is extended transversely across the bore 20 of the valve body. The seating surface 48 is generally tapered and suitably sized to provide a seal with the disc 16 even though the disc is not precisely extended transversely across the bore 20 and thereby reduces the necessity of precision in operation of the valve operator. The inner periphery 50 of the ring 44 is correspondingly tapered to provide support for the elastomeric material forming the seating surface 48.

The elastomeric material 46 is extended over the outer end face 52 of the ring 44 and extends beyond the outer periphery of the ring 44 into the respective larger counterbore 30. Further, an annular sealing bead 54 is formed on that portion of the elastomeric material 46 extending into the respective counterbore 30 to protrude beyond the respective end face 32 of the valve body in a position directly opposite the bottom of the respective counterbore 30.

The disc 16 is dished, providing a center flat portion 56 which fits against a flat 58 formed on one side of the valve stem 14 and is secured to the valve stem by suitable screws 60. The outer periphery 62 of the disc is rounded to minimize the possibility of damaging the seating surface 48 of the valve seat 42 as the disc is moved across the seating surface. It will thus be seen that the disc 16 is what is known as the off-set type.

The valve 10 is adapted to be mounted between a pair of pipe flanges 64 secured on the adjacent ends of adjacent pipe sections 66. The valve is held in operating position with the bore 20 in alignment with the pipe section 66 by a plurality of bolts 68 in the conventional manner of mounting wafer-type valves. Upon tightening of the bolts 68, the flange 64 at one end of the valve body sealingly engages and deforms the sealing bead 54 on the seat 42 to prevent the leakage of fluid from the respective pipe section radially outward between the flange 64 and the respective end of the valve body. At the same time, the opposite flange 64 sealingly engages and deforms the sealing bead 40 formed on the lining 34 at the opposite end of the valve body to prevent the leakage of fluid radially outward between the respective flange and end face 32 of the valve body. In this connection it may also be noted that the end faces 32 of the valve body 12 are preferably flat to be engaged by the respective flanges 64 upon the complete tightening of the bolts 68.

With the bolts 68 tightened and the flanges 64 in engagement with the opposite ends of the valve body, the ring 44 of the seat 42 is held against the bottom of the respective counterbore 28 to properly position the seating surface 48 with respect to the disc 16. It will also be observed that the elastomeric material 46 on the seat 42 has an interference fit with the end of the lining 34 terminating at the bottom of the respective counterbore 28 receiving the seat 42, such that the fluid being controlled will not leak radially outward between the seat 42 and the lining 34 where it would gain access to the valve body 12. Thus, the valve body 12 is completely shielded from the fluid being controlled, such that the body may be formed out of the most economical material having the necessary strength requirements.

The valve 10 operates in the usual manner whereby the valve is opened and closed by turning the valve stem 14 through essentially 90°. It is normally expected that the first portion of the valve to become worn and requiring replacement during use is the seating surface engaged by the disc 16. When such wear occurs with the present valve construction, the seat 42 may be easily replaced. The lining 34, on the other hand, will be subjected to a minimum of wear and will effectively protect the valve body 12 and provide the necessary stem seals through an extended period of use of the valve.

EMBODIMENT OF FIG. 3

The modified valve construction 10a shown in FIG. 3 utilizes the valve body 12, stem 14, disc 16 and seat 42 previously described in connection with FIGS. 1 and 2. In the valve 10a, the lining 34a is bonded only to that portion of the inner periphery of valve body between the counterbores 28. The lining 34a is of an elastomeric material, such as a rubber composition, and is preferably molded-in-place in the valve body 12 to tightly adhere to the inner periphery of the body. The apertures 36 formed in the lining 34a to receive the valve stem 14 at the opposite sides of the bore 20 are, as before, less in diameter than the diameter of the valve stem to provide an interference fit and form effective stem seals for the valve.

The valve 10a also employs a valve seat 70 in the end of the valve body opposite to the seat 42. The valve seat 70 may be of any desired material depending upon the service requirements. For example, the valve seat 70 may be formed of one of the commonly known plastic materials, such as Teflon or Nylon, or may be formed of metal in the event it is desired that the seat 70 be used for throttling. When the valve seat 70 is of a plastic material or metal, the outer diameter of the seat is of a size to provide a sliding fit of the seat in the respective counterbore 28, and a suitable sealing ring 72, such as an O-ring, is positioned in the respective counterbore 30 to be engaged by the pipe flange at that end of the body and provide an effective seal between the flange, the body and the seat. The seat 70 is also sized and shaped to engage the bottom of the respective counterbore 28 to accurately position the seating surface 74 of the seat with respect to the disc 16, and to have an interference fit with the respective end of the lining 34a to prevent the leakage of fluid between the lining and the seat. The radial size of the seat 74 will depend upon the material used for constructing the seat 70. If the seat 70 is formed of metal, then the seating surface 74 is sized to slidingly receive the disc 16 when the disc is turned to the position shown in dashed lines in FIG. 3 without interference between the disc and the seat. If the seating surface 74 is formed of a plastic material, then a slight interference is normally provided between the disc and the seating surface.

It will thus be seen that the valve 10a provides dual seats for the disc 16. In one desirable combination, the seat 42 is employed when it is desired to completely close the valve, and the seat 70 is employed by turning the valve stem 14 about 180° when it is desired to use the valve for a throttling function. In any event, the valve seats 42 and 70 may be easily replaced in the event of wear; whereas the lining 34a will be subjected to a minimum of wear and, in cooperation with the valve seats 42 and 70, will effectively shield the valve body from the fluid being controlled.

EMBODIMENT OF FIG. 4

In the valve assembly 10b illustrated in FIG. 4, the valve body 12b has an inner periphery formed in the same manner as the valve body previously described and contains the lining 34 and valve seat 42 previously described. However, the valve body 12b has a cylindrical outer periphery 80, rather than the configuration of the valve body previously described, and is radially supported by an operating housing 82.

The operating housing 82 has a bore 84 extending therethrough of a size to slidingly receive the valve body 12b. It will also be observed that the operating housing 82 has a length measured along the bore 84 substantially equal to the length of the valve body 12b in order that the operating housing will provide radial support for the entire length of the valve body, and the opposite ends of both the operating housing and the valve body will be engaged by pipe flanges (not shown) between which the valve assembly 10b is assembled in a manner similar to that previously described in connection with FIG. 2. It may also be noted in this connection that the bolts for the pipe flanges will surround the operating housing 82 in such a manner that the operating housing will be supported by and between the mating pipe flanges.

The valve stem 14 extends through the apertures 18 in the valve body 12b in the same manner as previously described. The valve stem also, however, extends through and is journaled in an aperture 86 formed in the operating housing 82 in alignment with the apertures 18 to provide additional support for the valve stem. A neck 88 is formed on the operating housing 82 around the aperture 86 and the outer end of the neck 88 is utilized to support the usual top works or valve operator which is employed in turning the valve stem 14 and thus opening and closing the valve assembly.

The valve assembly 10b retains the advantages of the valve 10 previously described in connection with FIG. 2, and further provides the advantages of providing what may be considered a replaceable valve unit in the event of damage to the lining 34. In view of the radial support provided by the operating housing 82, the valve body 12b may be formed much thinner than the valve body 12 previously described, such that replacement of the valve body 12b will be an economical undertaking in the event of damage to the lining 34. The sealing beads 54 and 40 formed at the opposite ends of the valve body 12b will effectively prevent the fluid being controlled from contacting the operating housing 82. Therefore, the operating housing 82 may be formed of the most economical material having the necessary strength requirements.

EMBODIMENT OF FIG. 5

The valve assembly 10c shown in FIG. 5 is similar to valve assembly 10b previously described, including a cylindrical valve body 12c slidingly supported in the bore 90 of a surrounding operating housing 82c. The operating housing 82c is constructed in essentially the same manner as the operating housing 82 previously described, except that in lieu of an aperture for journaling the valve stem 14, the operating housing 82c has a slot 92 formed therein extending from the inner to the outer periphery of the operating housing and from one end 94 of the housing to an intermediate or medial portion 96 of the housing. The end 96 of the slot 92 is spaced from the apertures 18 of the valve body 12c in order that the end of the slot will not interfere with the valve stem. It may also be noted that the width of the slot 92 is greater than the diameter of the valve stem 14, such that the valve body 12c may be inserted lengthwise in the operating housing from the end 94 of the housing with the valve stem 14 and disc 16 assembled in the valve body.

The valve stem 14 is extended beyond the neck portion 88 of the operating housing 82c for connection with a suitable handle 98 or the like for turning the valve stem. The handle 98 is supported on an indexing plate 100 which in turn is supported by a bracket 102 secured to the operating housing neck 88 by a fastener 104.

The modified valve body 12c has the same configuration at its inner periphery as the valve body 12 previously described, and has the lining 34a bonded around the central portion of the inner periphery in the same manner as the lining 34a previously described in connection with FIG. 3. In a preferred construction of the valve assembly 10c, a valve seat 42 is provided in each end of the valve body 12c fitting in the respective body counterbores 28 and 30. With this arrangement, the disc 16 may be moved to a closed position on either side of the centerline of the valve stem 14 by turning the valve stem 180°. Thus, a spare valve seat is provided in the event the seating surface of one of the valve seats becomes damaged through use, to extend the service life of the valve. The lining 34a, in combination with the seats 42, will effectively prevent the fluid being controlled from coming in contact with either the valve body 12c or the operating housing 82c. Thus, the valve body 12c and operating housing 82c may be made of economical materials, even when the valve assembly is to be used in a corrosive environment. In the event the stem seals provided by the lining 34a should become worn through use, it is simply necessary to replace the valve body 12c and is not necessary to replace the operating housing 82c, such that an economical construction is provided.

From the foregoing it will be apparent that the present invention provides a novel disc type valve wherein the valve body will be shielded from the fluid being handled, and yet the portion of the valve, mainly the valve seat, normally experiencing wear may be easily replaced. The lining of the present valve provides both a shielding or protecting function and forms the stem seals for the valve, but will be exposed to a minimum of wear during use of the valve.

Changes may be made in the combination and arrangement of arts or elements as heretofore set forth in the specification and shown in the drawing without departing from the spirit and scope of the invention as defined in the following claims.

What is claimed is:

1. A disc valve for controlling the flow of fluid through adjacent pipe sections having pipe flanges on the adjacent ends thereof, comprising:
   a valve body having opposite end faces adapted to be engaged by the pipe flanges and a bore therethrough aligned with the pipe sections, a counterbore in one end of the valve body forming an annular shoulder facing the respective end of the valve body;
   a valve stem journaled in the valve body extending diametrically across a medial portion of said bore;
   an off-set disc secured to the stem within said bore;
   a replaceable seat in said counterbore against said shoulder having an elastomer seating surface thereon shaped and sized to mate with the outer periphery of the disc when the disc is turned transversely across said bore to prevent the flow of fluid through the valve, said seat also having an annular elastomer sealing portion engaging the respective pipe flange and preventing the leakage of fluid from the respective pipe section between the valve body and the outer periphery of the seat; and
   an elastomer lining molded in lace around the wall of said bore from the seat to the opposite end of the valve body to shield the wall of said bore from the fluid being controlled and form seals around the valve stem, said lining being projected from said opposite end of the valve body and sealingly engaging the respective pipe flange to prevent the leakage of fluid between the respective pipe flange and the respective end face of the valve body.

2. A valve as defined in claim 1 wherein the lining is shaped to provide a radially inwardly extending boss around the valve stem at the opposite sides of said bore, the elastomer in each boss being responsive to the pressure of fluid in the valve for movement into tighter sealing engagement with the valve stem.

3. A disc valve as defined in claim 1 wherein the bore of the valve body has a larger diameter counterbore in the end thereof having the first mentioned counterbore formed therein, and said annular elastomer sealing portion is positioned in the larger diameter counterbore.

4. A disc valve as defined in claim 1 wherein the elastomer on the seat has an interference fit with the lining when the seat is in operating position in the valve body.

5. A disc valve for controlling the flow of fluid through adjacent piping sections having pipe flanges on the adjacent ends thereof, comprising:
   a valve body having opposite end faces adapted to be engaged by the pipe flanges and a bore therethrough aligned with the pipe sections, a counterbore in each end of the body bore, each counterbore forming an annular shoulder facing the respective end of the valve body;
   a valve stem journaled in the valve body extending diametrically across the medial portion of said bore;
   an off-set disc secured to the stem within said bore;
   a replaceable seat in each counterbore against the shoulder formed thereby, each seat having an elastomer seating surface thereon sized and shaped to mate with the outer periphery of the disc when the disc is extended transversely across said bore on the respective side of the centerline of the valve stem, each seat also having an annular elastomer sealing portion engaging the respective pipe flange and preventing the leakage of fluid from the respective pipe section between the valve body and the outer periphery of the respective seat; and
   an elastomer lining molded-in-place around the wall of said bore between said seats, the lining sealingly engaging a portion of each of the seats, the seats and the lining cooperating to shield the valve body from the fluid being controlled and the lining forming seals around the valve stem.

6. A disc valve as defined in claim 5 wherein the bore through the valve body has a pair of concentric counterbores in each end thereof, each valve seat slidingly fits in the smaller diameter counterbore at the respective end of the valve body, and the annular elastomer sealing portion of each seat fits in the larger diameter counterbore at the respective end of the valve body.

7. A disc valve for controlling the flow of fluid through adjacent pipe sections having pipe flanges on the adjacent ends thereof, comprising:
   a valve body having opposite end faces adapted to be engaged by the pipe flanges and a bore therethrough aligned with the pipe sections, the outer periphery of the valve body being substantially cylindrically shaped;
   a valve stem journaled in the valve body extending diametrically across a medial portion of said bore;
   an off-set disc secured to the stem within said bore;
   a replaceable seat in one end of the valve body having an elastomer seating surface thereon shaped and sized to mate with the outer periphery of the disc when the disc is turned transversely across said bore to prevent the flow of fluid through the valve, said seat also having an annular elastomer sealing portion engaging the respective pipe flange and preventing the leakage of fluid from the respective pipe section between the valve body and the outer periphery of the seat;
   an elastomer lining molded in lace around the wall of said bore from the seat to the opposite end of the valve body to shield the wall of said bore from the fluid being controlled and form seals around the valve stem, said lining being projected from said opposite end of the valve body and sealingly engaging the respective pipe flange to prevent the leakage of fluid between the respective pipe flange and the respective end face of the valve body; and an operating housing having a bore therethrough of a size to slidingly receive the valve body and an opening therein receiving the valve stem.

8. A disc valve as defined in claim 7 wherein the length of the operating housing, measured along the bore therethrough, is substantially equal to the length of the valve body between said end faces, and wherein the opening in the operating housing comprises an aperture therein extending at a right angle to the bore therethrough journally receiving a portion of the valve stem.

9. A disc valve as defined in claim 7 wherein the length of the operating housing, measured along the bore therethrough, is substantially equal to the length of the valve body between said end faces, and wherein the opening in the operating housing comprises a slot therein from the inner to the outer periphery thereof having a width greater than the diameter of the valve stem and extending from one end of the operating housing to the medial portion of the operating housing, whereby the valve body may be inserted in the operating housing from said one end with the disc valve and stem installed in the valve body.

* * * * *